United States Patent
Rajashekara et al.

(10) Patent No.: US 7,648,784 B2
(45) Date of Patent: Jan. 19, 2010

(54) METHOD AND APPARATUS FOR CONTROLLING A FUEL CELL SYSTEM HAVING A VARIABLE NUMBER OF PARALLEL-CONNECTED MODULES

(75) Inventors: Kaushik Rajashekara, Carmel, IN (US); George N. Simopoulos, Noblesville, IN (US); Michael T. Faville, Geneseo, NY (US); Elwood W. Wingeier, Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 666 days.

(21) Appl. No.: 11/371,733

(22) Filed: Mar. 9, 2006

(65) Prior Publication Data

US 2009/0305087 A1    Dec. 10, 2009

(51) Int. Cl.
*H01M 8/04* (2006.01)
(52) U.S. Cl. .............................. 429/13; 429/22; 429/23
(58) Field of Classification Search .................. 429/13, 429/22, 23, 24, 25
See application file for complete search history.

(56) References Cited

U.S. PATENT DOCUMENTS

| | | | | |
|---|---|---|---|---|
| 6,773,839 | B2 * | 8/2004 | Fuglevand et al. | 429/22 |
| 6,815,101 | B2 * | 11/2004 | de Vaal et al. | 429/13 |
| 7,144,646 | B2 * | 12/2006 | Pearson | 429/21 |
| 7,332,236 | B2 * | 2/2008 | Ballantine et al. | 429/13 |
| 2002/0177015 | A1 * | 11/2002 | Fuglevand | 429/13 X |
| 2005/0112428 | A1 | 5/2005 | Freeman et al. | |

\* cited by examiner

*Primary Examiner*—Stephen J. Kalafut
(74) *Attorney, Agent, or Firm*—Thomas N. Twomey (57) ABSTRACT

A fuel cell APU system comprising a plurality of fuel cell modules connected in parallel. Each module includes a local controller connected to a master controller that coordinates the modules to achieve a desired power output at any given time. Each module is operated within an output range to maximize efficiency of the system. When load demand on a first module exceeds the desired output range of the module, an additional module is brought online in parallel with the first. As the load increases further, additional modules are brought online in cascade fashion to permit all modules to be operated efficiently. If a module is disabled, it is automatically switched out of service and replaced by a standby module. The master controller keeps track of the total operating time of each module and varies the sequence in which different modules are brought into service to balance deterioration among the modules.

18 Claims, 8 Drawing Sheets

METHOD AND APPARATUS FOR CONTROLLING A FUEL CELL SYSTEM HAVING A VARIABLE NUMBER OF PARALLEL-CONNECTED MODULES

This invention was made with United States Government support under Government Contract/Purchase Order W56HZV-04-0004. The Government has certain rights in this invention.

TECHNICAL FIELD

The present invention relates to fuel cell modules; more particularly, to a means for controlling the combined operation of a plurality of fuel cell modules; and most particularly, to method and apparatus for controlling a system of variably parallel-connectable fuel cell modules.

BACKGROUND OF THE INVENTION

Fuel cell power modules based on solid oxide fuel cells are well known. A solid oxide fuel cell typically combines hydrogen and oxygen to generate electric voltage and current at an anode by transport of oxygen across a solid oxide electrolyte separating a cathode in an oxygen (air) atmosphere and the anode in a hydrogen/CO atmosphere, typically reformed hydrocarbons known in the art as reformate. To gain electrical output capacity, it is known to combine a plurality of individual fuel cells into a so-called fuel cell "stack" wherein the fuel cells are connected electrically in series and are supplied and exhausted in parallel with reformate and air by respective supply and exhaust manifolds. Such a fuel cell stack is known to contain, for example, 60 individual fuel cells, which, in series, can produce approximately 42 volts at full load.

To minimize pressure and flow losses along the manifolds, as well as to provide a more compact fuel cell system, the total stack is commonly divided into two 30-cell stacks, each of which then receives separate anode and cathode gas flows in parallel although the two stacks are still connected electrically in series.

A prior art module further comprises the systems necessary for operation, including fuel supply (hydrocarbon reformate), typically including a catalytic hydrocarbon reformer; air supply for reforming, fuel cell combustion, and cooling; manifolding and ducting for anode and cathode gases; numerous valves and switches; electrical conditioning and regulating components for the module output; and an electronic controller for controlling all activities within the module.

Because of its relatively slow starting characteristics, dictated by high temperatures necessary for catalytic reforming and oxygen ion transport across the electrolyte membrane, such a fuel cell module is especially preferred for providing accessory electric power in a vehicle or a stationary application. In these applications, a fuel cell module is commonly referred to as an Auxiliary Power Unit (APU).

In some known applications, for example, in military and heavy-duty truck vehicles, the power required for the accessory load is on the order of about 5-10 kW.

In a first prior art approach, one large dedicated APU provides power for all the electrical loads and other mechanical loads such as compressors. Such a large, central system is vulnerable to overall system failure when any portion of the APU fails.

US Patent Application Publication No. 2005/0112428 A1, published May 26, 2005, and referred to herein as "the '428 publication", discloses a second prior art approach wherein, instead of using a single large APU to meet all of the auxiliary power needs of a particular application, a plurality of smaller APU modules are provided each with a local ("slave") controller. The local controllers are linked to a master controller to define a "fuel cell power system having multiple fuel cell modules". In a preferred disclosed embodiment, the modules are connected in electrical series, and variations in power load are met by connecting more or fewer of the modules together. A disadvantage of such an arrangement is that the system cannot operate at a fixed voltage, as the total voltage of the system at any given time is the sum of the individual modules presently connected. As more modules are connected, the output voltage of the system increases by the added voltage of the additional modules. For many applications, for example, for automotive uses, it is highly desirable that an APU system function at a fixed voltage.

In the '428 publication, the master controller manages power production by relaying individual power production requirements to each of the slave controllers. The master controller decides what mode each module must be in and determines how much power each module must generate to contribute to the overall power requirement. Further, the master controller monitors various aspects of module and system performance to re-allocate individual power requirements amongst the power modules, as well as determining how many modules must be brought online to meet a given load.

A serious drawback of the disclosed approach is that operating efficiency as a function of load is not considered; indeed, no guidance is provided as to how the master controller is to decide how many modules should be in operation at any given time and what criteria, if any, should be used to optimize overall system performance and fuel economy.

The '428 publication discloses to remove from service and then replace any individual module that fails. A significant shortcoming of a series system is that during such removal by switching out, the system voltage is reduced and hence output power is diminished. Increasing the load on each of the remaining modules can increase the total output current but cannot restore the voltage to what it was. Further, in a series arrangement, the outright failure of any module immediately causes loss of electrical continuity, and hence failure, of the overall system.

The '428 publication teaches to load each of the modules according to its current fitness for use, and thus no thought is given to maximizing the life of each module by changing the workload allocation to balance accrued operation time among modules to balance module deterioration.

The '428 publication teaches an APU system comprising a plurality of individual fuel cell modules but is silent on geographic distribution of the modules within a particular application, for example, within a vehicle.

The '428 publication discloses that "of course, as may be necessary, any number of fuel cell power modules in the multiple fuel cell power system of the present invention can be connected in parallel as shown in FIG. 3", but teaches no more about parallel connection and thus is silent as to how such parallel arrangement is to be controlled. No control logic is disclosed by which the master controller may achieve performance and economy objectives for such a parallel-connection system. Further, the '428 publication does not suggest or disclose to enable a variable number of modules as dictated by the load imposed on the system at any given time.

What is needed is a method for controlling an APU system comprising a plurality of individual APU fuel cell modules connected electrically in parallel to maximize the efficiency and working lifetime of the system.

It is a principal object of the present invention to provide a constant output voltage from a fuel cell APU system comprising a plurality of fuel cell modules over a wide range of power demands greater than the power output capability of an single module.

It is a further object of the invention to provide such output voltage by balancing the load among the fuel cell modules to allow each module to operate within a maximum efficiency window.

SUMMARY OF THE INVENTION

Briefly described, a fuel cell APU system in accordance with the invention comprises a plurality of fuel cell modules connected electrically in parallel. Each module operates at the nominal voltage of the system, for example, about 24 volts. Each module includes a local controller connected to a master controller. The local controller controls the internal activities of its own module and preferably is embedded with the module. The master controller directs the coordination of the various modules to achieve a desired power output at any given time. Each module is operated within a predetermined power output range to maximize fuel efficiency of the module. When load demand on a first module exceeds the desired output operating range of the module, an additional module is brought online by the master controller in parallel with the first module, each of the two modules then being able to operate within its desired output window. As the load increases still further, additional modules are brought online in cascade fashion, again to permit all modules to be operated efficiently. Similarly, modules are taken offline as load diminishes. Modules preferably are on standby mode when not required for output service.

In the present embodiment, if one of the modules in service is disabled by, for example, accident or physical damage, internal failure, or warfare, the master controller automatically switches the disabled module out of service and brings a standby replacement online to immediately restore overall system performance.

The master controller monitors not only the operating condition and readiness status of each module but also keeps track of the total accrued operating time of each module and varies the sequence in which different modules are brought into service in order to balance deterioration among all the modules, thereby maximizing the life of the overall system, and minimizing maintenance and/or module replacement.

In a currently preferred embodiment for use in, for example, a vehicle and especially in military vehicles intended for combat conditions, the various modules are geographically separated, which minimizes the vulnerability of the overall system to external damage and also minimizes the size and weight of wiring harness required, as compared to a prior art centralized large, single APU or centralized modular APU.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

The benefits and advantages of an APU system comprising a plurality of APU modules, and method for operation thereof, in accordance with the invention will be better appreciated after first considering a prior art multiple-module APU system.

Figure 1:
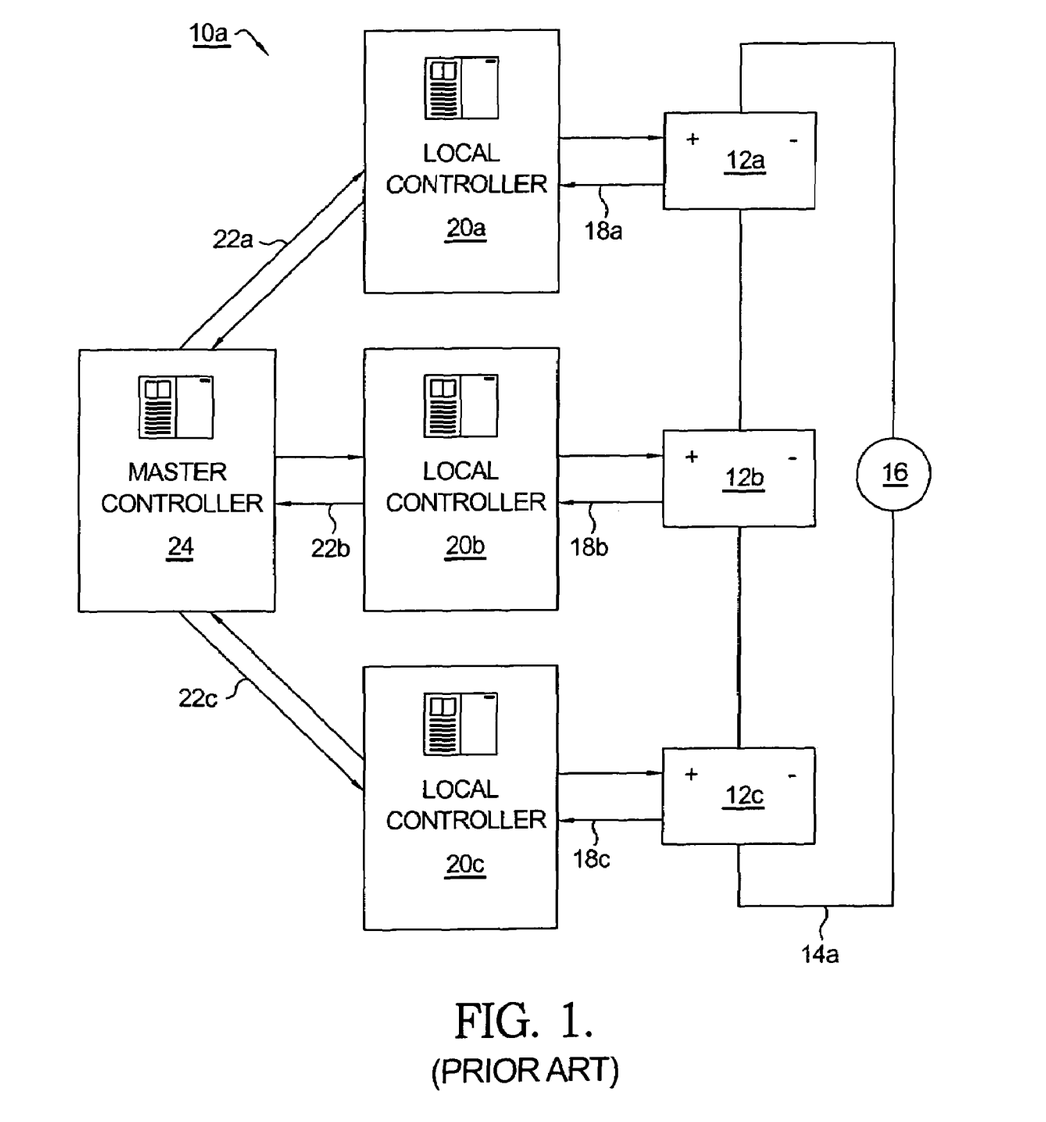
FIG. 1 is a schematic drawing of a prior art fuel cell APU system substantially as disclosed in publication '428, showing APU modules connected in series.

Referring to FIG. 1, a first prior art APU system 10a comprises a plurality of fuel cell modules 12a, 12b, 12c connected in a circuit 14a in series to drive a load 16. Each fuel cell module is connected via communication lines 18a, 18b, 18c to a local controller 20a, 20b, 20c which in turn is connected via communication lines 22a, 22b, 22c to a master controller 24. The communication lines 18a, 18b, 18c, 22a, 22b, 22c are used herein to indicate generally communications between the master controller and the local controllers and between the local controllers and the associated fuel cell modules, and hence are to be construed generally. For example, each local controller may send commands or requests to respective fuel cells and their associated peripheral devices and, in return, receive signals/readings from sensors on these fuel cells and/or associated peripheral devices.

The master controller is not directly linked to the fuel cell modules and thus does not communicate directly with the modules. The master controller decides what mode each module is to be in (e.g., start mode, standby mode, wait/pre-charge mode, run mode, cool-down mode, recovery mode, quick shut-down mode, cathode purge, anode purge, etc.). When system 10a is in run mode, the master controller determines how much power each module must generate to contribute to the overall power requirement. The master controller receives power requirement signals from users or other external controllers (e.g., a vehicle controller, not shown) and monitors overall system performance (total generated power) to ensure that the overall power requirement is satisfied. The master controller can monitor faults and determine when to shut down and bypass a given fuel cell module or when to reallocate load among the modules based on relative performance of the modules. Of course, shutting down and then bypassing a module causes an immediate reduction in output voltage of the overall system.

As described above, the fundamental strategy for operating prior art APU system 10a is to determine what power load each module must deliver and then to assign that load as an operating requirement. There is no disclosed consideration, other than go-no go, of the operational fitness of each module to deliver the load imposed; thus, there is no means for insuring that each module is operating within its own optimal load range. Furthermore, prior art system 10a must operate with all its modules functioning at all times because the modules are connected in series; thus, for applications requiring a very wide range of loads, the modules must necessarily be operated at various times in output ranges that are either highly fuel-inefficient or are damaging to the modules (peak power demands), or both. The only way to avoid the latter problem is to provide an excess of modules in respect of normal working loads to accommodate the relatively rare peak power demands. Such an arrangement is bulky, expensive, and inefficient.

Figure 2:
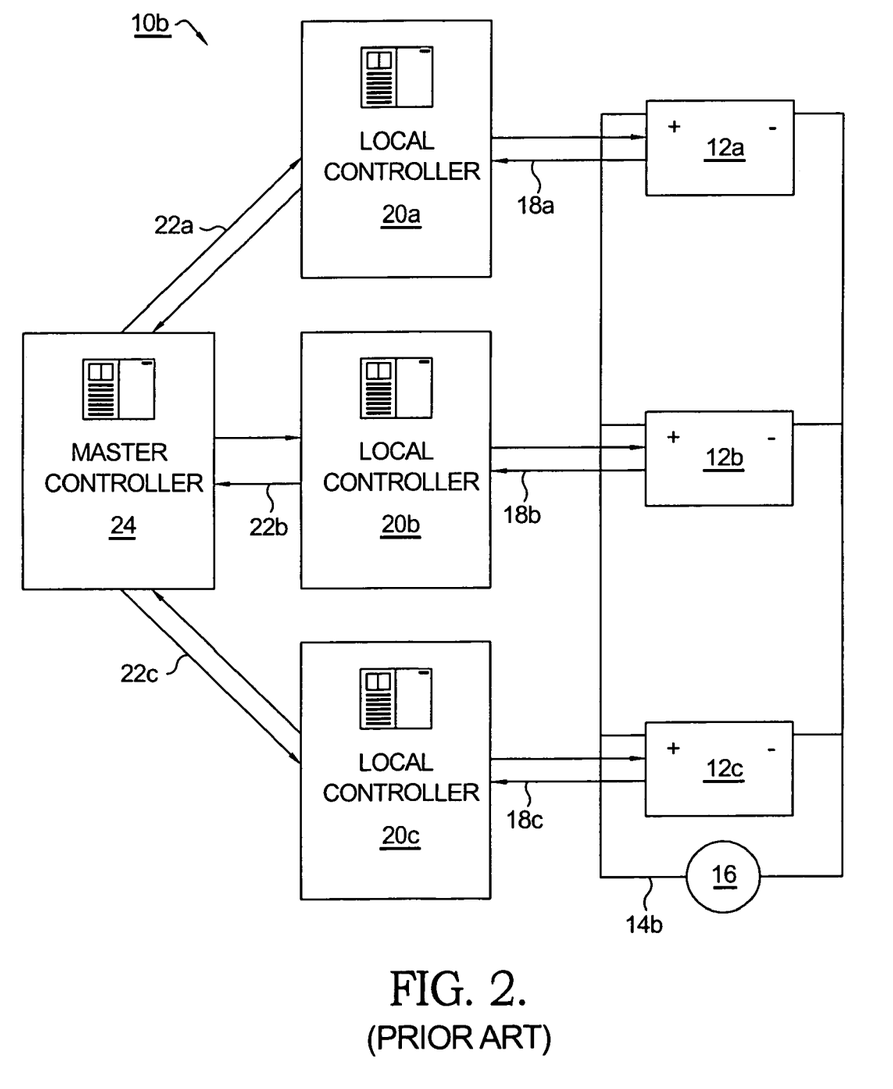
FIG. 2 is a schematic drawing of a prior art fuel cell APU system substantially as disclosed in publication '428, showing APU modules connected in parallel.

Referring to FIG. 2, a second prior art APU system 10b comprises a plurality of fuel cell modules 12a, 12b, 12c connected in parallel in a circuit 14b to drive a load 16. All the components are as previously shown in FIG. 1 and need not be repeated here. The parallel circuit 14b shown in FIG. 2 affords the advantage of maintaining a constant output voltage irrespective of the number of modules in the system. However, the '428 publication is silent on a strategy for controlling the modules in a parallel-wired APU system, or on varying the number of modules connected, to enjoy the operating benefits such connectivity affords, which is the subject of the present invention.

Figure 3:
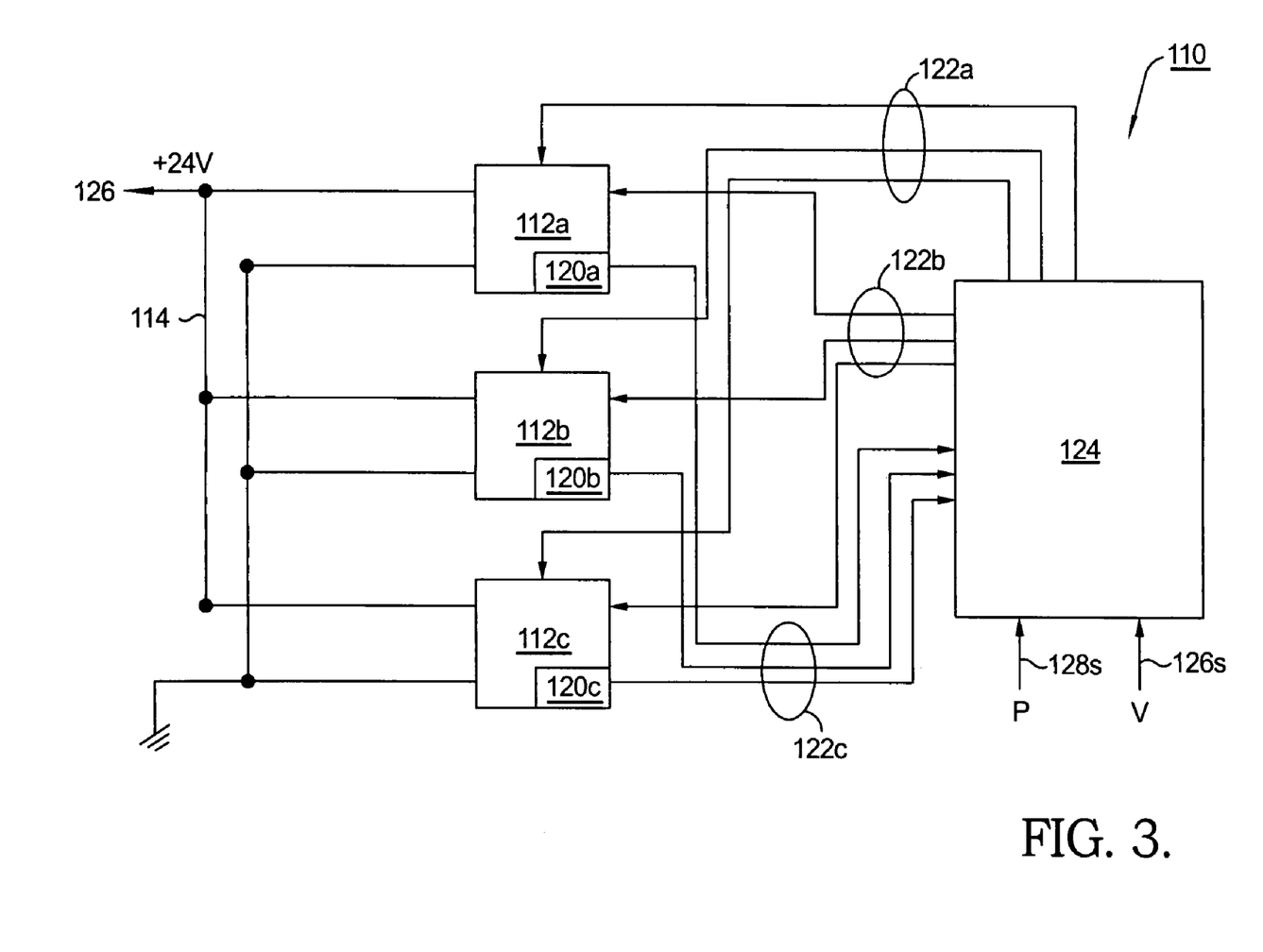
FIG. 3 is a schematic drawing of a fuel cell APU system in accordance with the invention, comprising a plurality of individual APU modules connected in parallel.

Referring now to FIG. 3, a first embodiment 110 of an improved fuel cell APU system is similar in components and layout to prior art embodiment 10a. The improvement of the present invention lies in the strategy by which the master controller coordinates variable use of the individual modules to maximize module working life, as well as to maximize fuel efficiency consistent with meeting power requirements at all times.

A plurality of fuel cell modules 112a, 112b, 112c are individually and variably connectable into a circuit 114 in parallel to drive a load (not shown but similar to load 16) at a fixed voltage 126, preferably about 24 volts. The number of modules enabled at any given moment is selected to meet the power demand of the application at that moment; thus, with variation in power demand, the number of modules in service will be varied by instruction from a master controller 124. In a currently preferred embodiment, each module is a fuel cell stack comprising a plurality of individual fuel cell elements as is well known in the prior art; and further, each fuel cell element is of a type referred to in the art as a solid oxide fuel cell; and further, the modules are identical and may be interchanged or replaced by other identical modules from storage, thus limiting the number of module models to one. Also preferred is that each local controller 120a, 120b, 120c is electronically embedded within its respective module. The local controller in each fuel cell module is connected to master controller 124 via communication lines 122a controlling on/off functions; 122b controlling enable/disable functions for connecting or disconnecting the modules into and out of the system 110; and 122c for controlling other functions concerned with readiness for service of each of the modules. Communication lines 122a, 122b, 122c are used herein to indicate communications between master controller 124 and local controllers 120a, 120b, 120c are to be construed generally. For example, each local controller may send commands or requests its respective fuel cell module and any associated peripheral devices and, in return, may receive signals/readings from sensors on the fuel cell module and/or associated peripheral devices.

The master controller is not directly linked with the fuel cell modules and thus does not communicate directly with the modules. However, the master controller receives performance indicators in the form of an APU output voltage signal 126s and an APU output current signal 128s. The master controller decides what mode each module is in (e.g., start mode, standby mode, wait/pre-charge mode, run mode, cool-down mode, recovery mode, quick shut-down mode, cathode purge, anode purge, etc.). When running (i.e., when in run mode), the master controller determines how many modules must be enabled to meet the overall power requirement, as described below. The master controller receives power requirement signals from users or other external controllers (e.g., a vehicle controller, not shown) and monitors overall system performance (total generated power) to ensure that the overall power requirement is satisfied in an optimal and efficient manner. The master controller can monitor faults and determine when to shut down and bypass a given fuel cell module or when to reallocate load among the modules based on relative performance of the modules. Of course, shutting down or bypassing a module causes no reduction in output voltage 126 of the system but can cause a brief, temporary reduction in output power of the system until outputs of the modules in the reconfigured system are re-balanced by the master controller.

The master controller can also monitor the total time of use of each module and can vary the priority in which individual modules are added to or subtracted from the productive system to equalize the usage times for the various modules.

Figure 4:
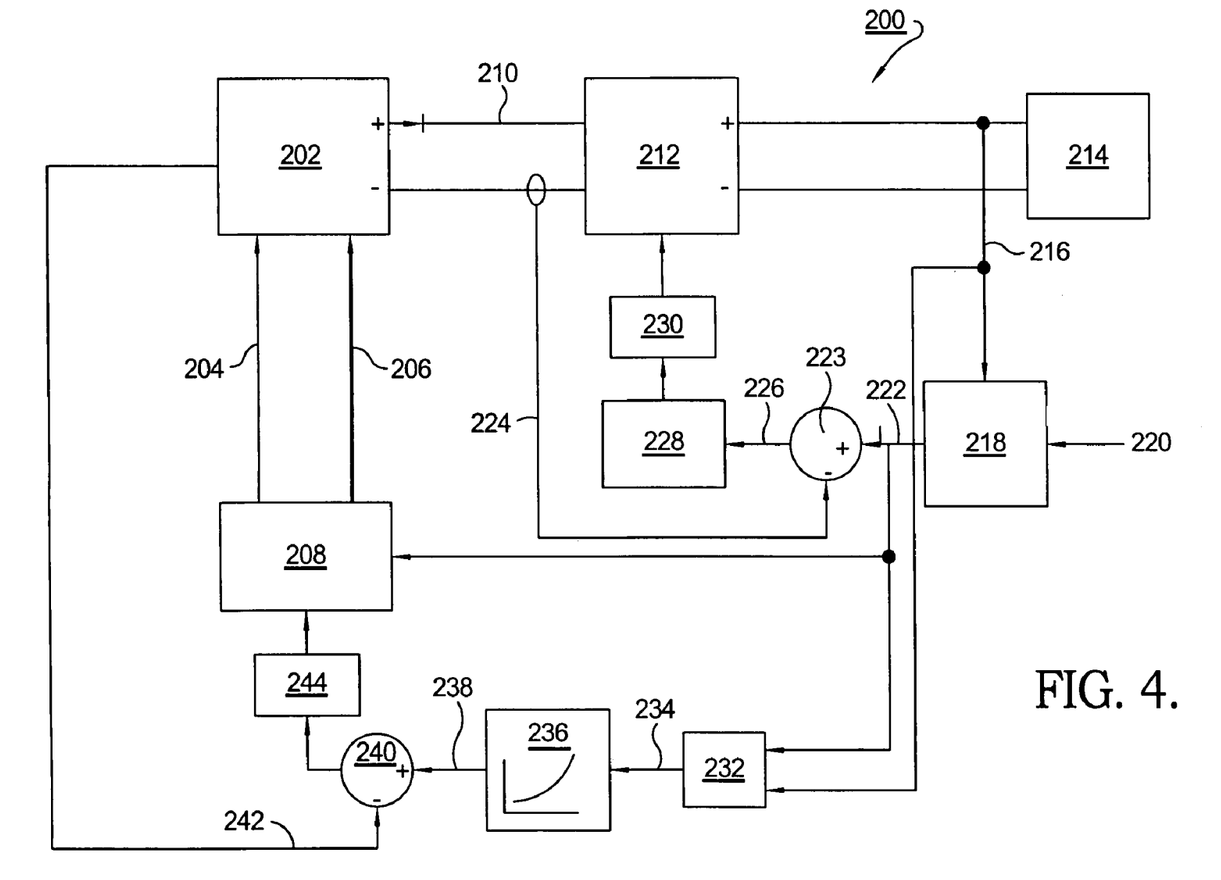
FIG. 4 is a schematic drawing showing a novel load control logic for an individual APU module in the drawing shown in FIG. 3.

Referring to FIG. 4, a load control strategy 200 is shown which is applicable to each of the individual fuel cell modules and local controllers 112/120.

A fuel cell stack 202 is supplied with air 204 and fuel 206 (preferably reformate) from a generic fuel cell control module 208. Stack 202 supplies DC power in a circuit 210 passing through a DC/DC power converter 212 and load 214. Voltage in circuit 210 is sensed 216, and the voltage value is divided 218 by a reference power value 220 to yield a reference current 222. Reference current 222 is compared 223 to the sensed actual current 224 in circuit 210, and the difference 226 is fed through a P-I control unit 228 to generate a control signal 230 for power converter 212. Further, the sensed voltage value 216 is multiplied 232 by the reference current 222 to generate a power value 234 that is entered into a preprogrammed lookup table 236 to determine a reference temperature 238. The reference temperature 238 is compared 240 to the actual stack temperature 242 and an error signal 244 is sent to the fuel cell control module 208. The reference current value 222 is also sent to the fuel cell control module which employs an internal algorithm, using error signal 244 and reference current value 222, to adjust the flows of air 204 and fuel 206 to cause the sensed actual current 224 to equal the calculated reference current 222.

An advantage of an APU system comprising a parallel-connected variable plurality of individual APU modules is that the voltage may be held constant while the power outputs of the modules may be selectively added together in cascade fashion to provide a very wide range of available power, limited only by the number of modules connected. In the examples shown herein, the number of modules is three, but it will be obvious that any plurality is possible within the scope of the present invention. However, a three-module APU can provide a range of power extending to a peak power output of about 12 kW, which is adequate for many APU system uses.

Figure 5:
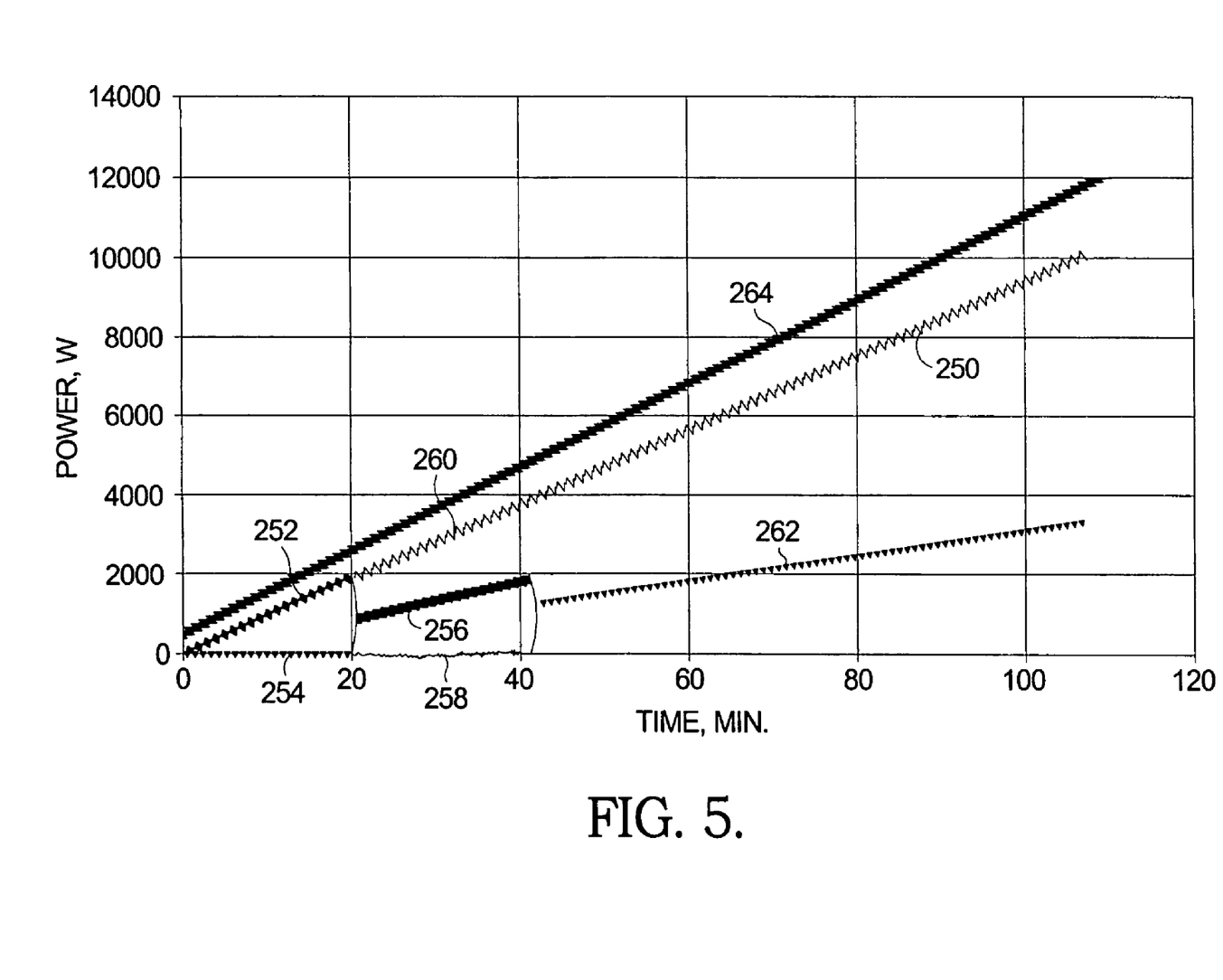
FIG. 5 is a graph showing a control strategy for progressive cascade linking of individual APU modules to satisfy an increasing power load on an APU system.

Referring now to FIG. 5, a cascade control capability of an APU system such as system 110 (FIG. 3) is exemplarily shown when required to meet a linearly increasing load 250. At time 0, all three modules 112a, 112b, 112c are in a ready but disabled state. At a command from master controller 124, first module 112a is enabled and begins generating power. As exemplarily shown, the power 252 of first-module 112a alone meets the required load up to about 2 kW at 20 minutes, during which time second and third modules 112b, 112c remain on standby 254. At 20 minutes, second module 112b is enabled and thereby coupled in parallel with first module 112a. The output of first module 112a is reduced to 1 kW, and second module 112b is started at 1 kW. Thus the output of each of the two modules follows curve 256, third module 112c remains on standby 258, and the output of the two modules together 260 follows load curve 250 up to 4 kW, at which time third module 112c is enabled. The output of the first two modules is reduced by one-third each, to 1333 W, and third module 112c is started at 1333 W, such that the three modules together contribute power equally from that point onward. Thus the output of each of the three modules follows curve 262, to continue to meet load curve 250. Thus, by selecting the number of modules to enable at any given time, a power range is obtainable far greater than the power range of any one module. Note that the total available power of the APU, curve 264, is sufficient to meet the total load at any point, and that, by sharing the increasing load in cascade fashion, none of the modules is ever called upon to run at greater than about 85% of full power. Further, unlike prior art systems 10a, 10b, only the minimum number of modules required to satisfy presently-pertaining power demand are enabled at any give time.

Figure 6:
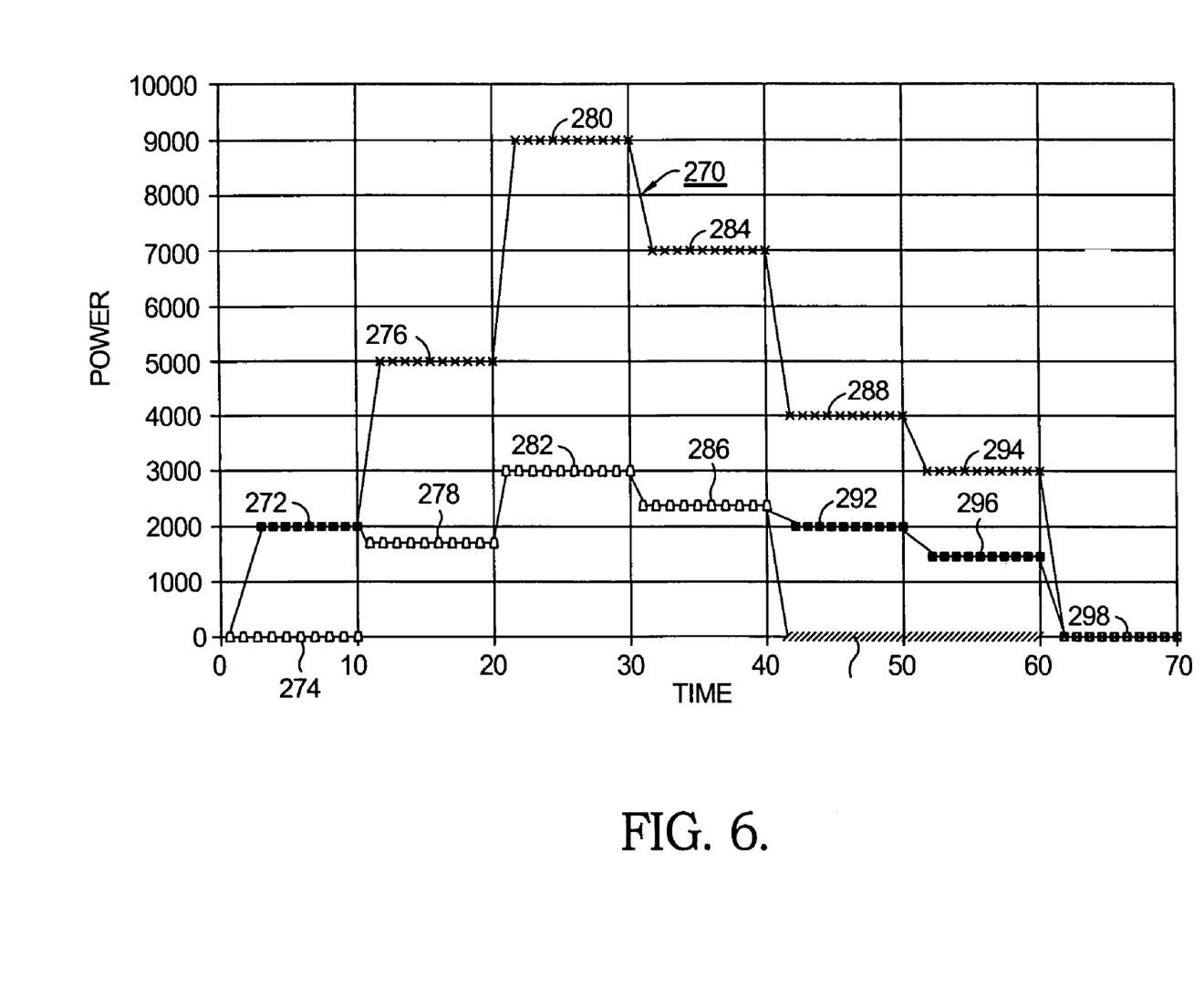
FIG. 6 is a graph showing an exemplary use of the cascade control system shown in FIG. 5 to meet a varying power requirement.

Referring to FIG. 6, an exemplary application of cascade module coupling is shown in response to a varying load. Total load power curve 270 represents the load power output of APU 110 as may be required over time, analogous to curve 250 in FIG. 5. The load is shown as varying stepwise at 10-minute intervals, the load both increasing and decreasing. In the first ten minutes, first module 12a quickly ramps up to a steady output of 2 kW (272). Second and third modules 112b, 112c remain on standby (274). When the load is increased to 5 kW (276), addition of second module 112b is insufficient to meet the new load requirement while keeping the modules within a desirable range of percentage output; thus, both the second and third modules are coupled in, each of the three modules being operated at an output of 5/3 kW (278). When the load is increased to 9 kW (280), the output of each of the three modules is increased to 3 kW (282). When the load is decreased to 7 kW (284), the output of each of the three modules is decreased to 7/3 kW (286). When the load is decreased to 4 kW (288), third module 112c is no longer required and is disabled and placed on standby again (290), and first and second modules 112a, 112b are operated at 2 kW each (292). When the load is decreased to 3 kW (294), first and second modules 112a, 112b are operated at 1.5 kW each (296). When the load is decreased to zero, all three modules are disabled and placed on standby (298).

It is important to note that this control scheme for parallel connectivity permits immediate disabling of any individual module that becomes unfit for service and allows either a replacement module to be substituted immediately or the other modules to ramp up their output to continue to meet load requirements (at all but the highest loads).

Figure 7:
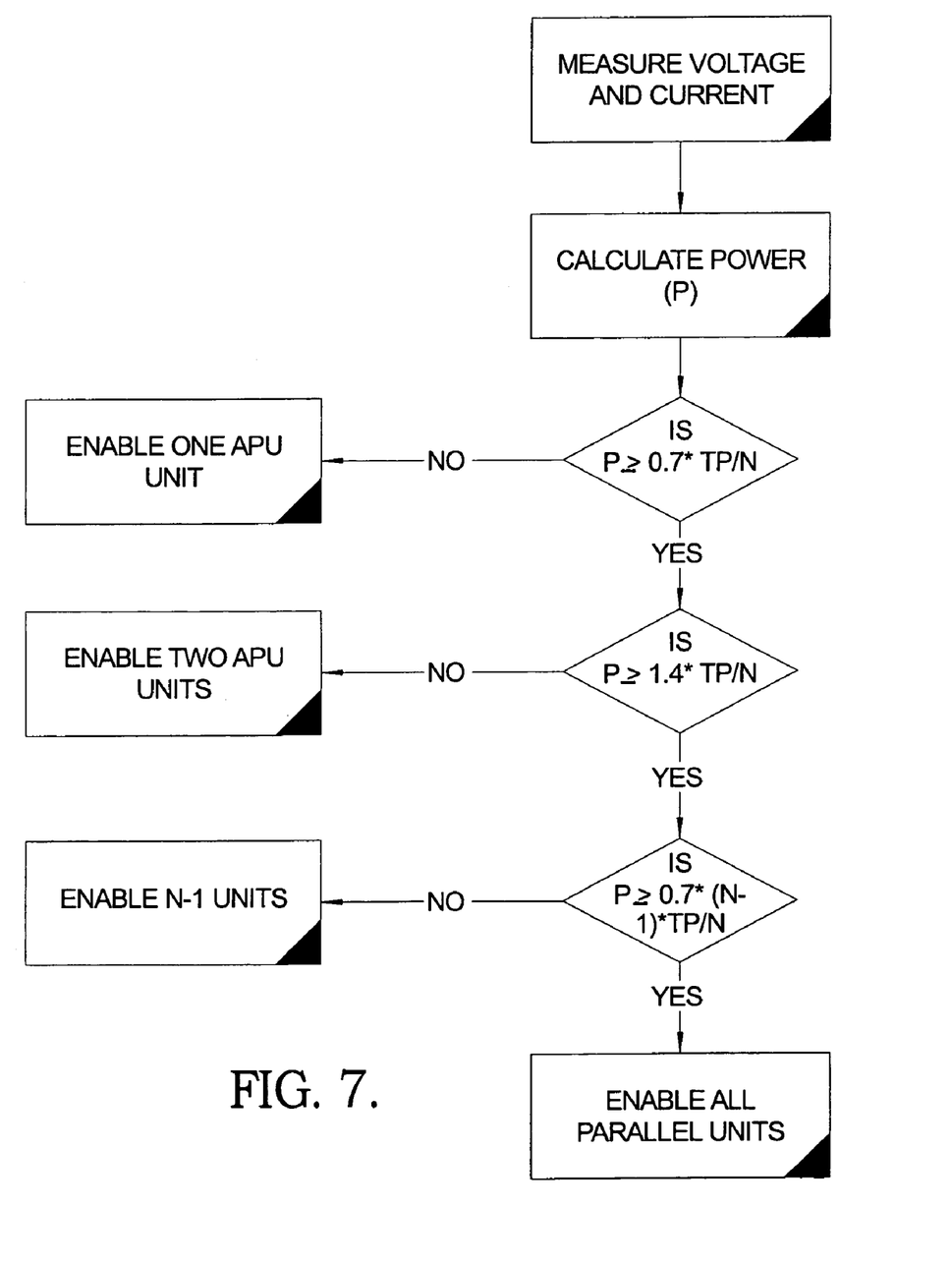
FIG. 7 is a flow chart of an algorithm for controlling a fuel cell APU system in accordance with the invention.

Referring to FIG. 7, a control algorithm is shown which is generally applicable to APU systems having N modules capable of a total power output TP and parallel connectivity. A switch point for adding or subtracting modules is chosen as 70% load, which is within a fuel-efficient range of module operation, as described below, although other switch points may be selected within the scope of the present invention. The module load switch point LSP in any APU system will depend upon, among other factors, the actual module design, the module efficiency range, and the system calibration values.

The voltage and current V and C are measured to determine a calculated power requirement P. If P is less than LSP times TP divided by N, only one module is enabled. If P is between (one and two times LSP times TP/N), two modules are enabled. If P is between (2LSP times TP/N) and (LSP times (N-1) times TP/N), then N-1 modules are enabled. Finally, if (P>LSP times (N-1) times TP/N), all modules are enabled.

The algorithm shown in FIG. 7, wherein LSP=0.7, permits any enabled modules to be operated at or below an output power level of about 70%, except under very high power loads when all modules may be required to operate at well above 70%.

Figure 8:
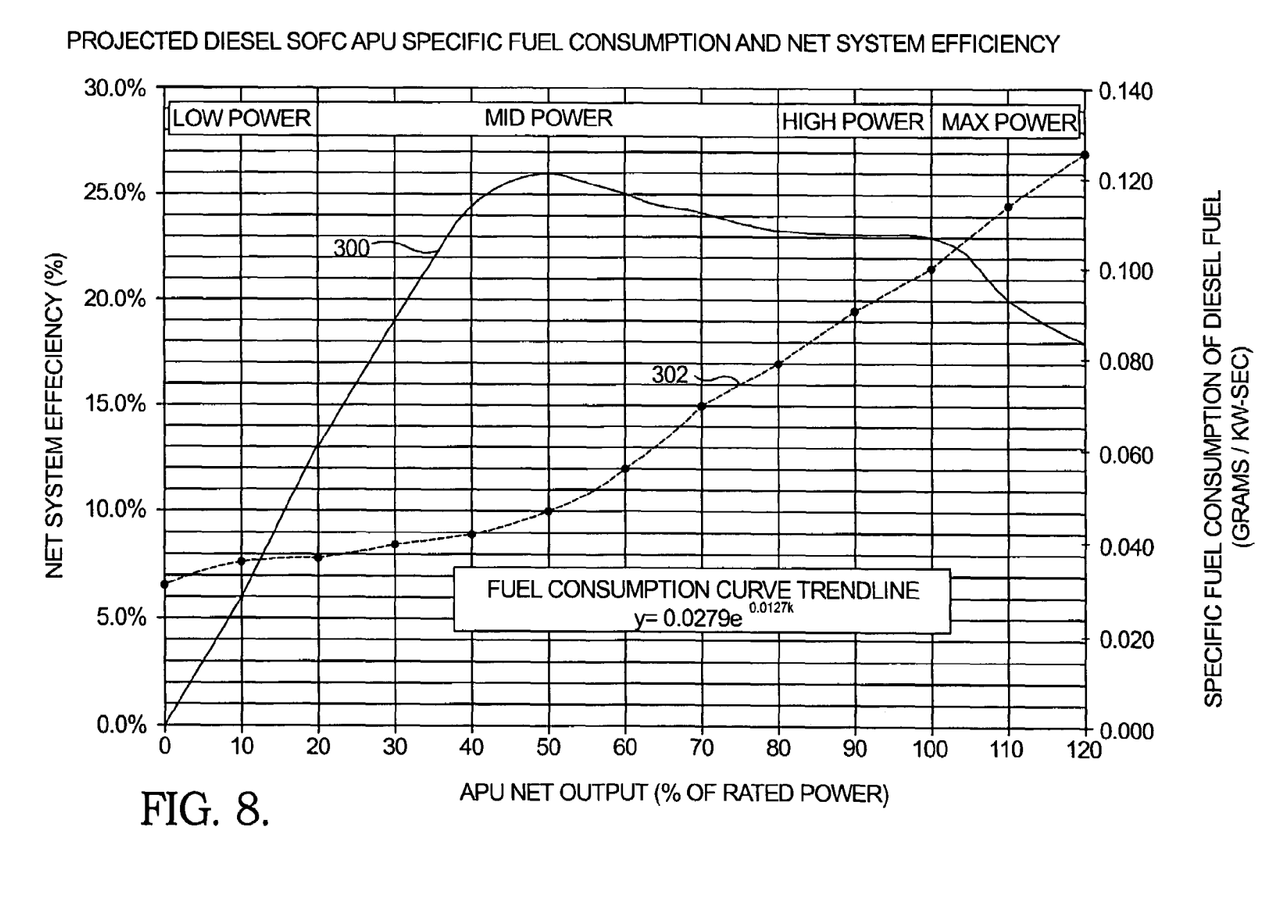
FIG. 8 is an exemplary graph showing net system efficiency and specific fuel consumption as a function of APU net power output for an APU system in accordance with the invention.

The benefit of operating APU system 110 in a mid-range of power output between about 40% and about 80% for each enabled module is shown by the exemplary curves in FIG. 8. Curve 300 shows the percent net system fuel efficiency as a function of net percentage of rated output power, which climbs quickly as power is increased, to about 25% efficiency at about 40% of rated output, and then levels off or declines slightly up to about 100% of rated power. Curve 302 shows specific fuel consumption over the rated power range. Between 50% and 60% rated power, fuel consumption accelerates rapidly although nearly in proportion to the increase in output power. Thus a range of operation of about 40%-80% of rated output power is comfortable. Beyond 100% of rated power, efficiency drops off rapidly with a steeper fuel consumption slope.

In system 110 as just described, first module 12a accumulates the most enabled time, and third module 112c the least. However, as noted above, master controller 124 keeps track of the total enablement time for each module. At a predetermined total energy delivery limit and/or total period of power output, the lead module is reassigned to the last-module position to even out accumulated deterioration. Thus, the module originally designated as first module 112a is reassigned as 112c; module 112b becomes the lead module 112a; and module 112c becomes 112b. Thus, the incidence of end-of-life failure is postponed for all modules in comparison to a non-rotated system wherein a given module is always the lead module.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system for providing an electric power output in response to a load demanded by a system application, comprising:
   a) a plurality of fuel cell modules, each including a local module controller, wherein said plurality of fuel cell modules are variably connectable in parallel and capable of a total power output TP; and
   b) a master controller in communication with said plurality of local module controllers,
   wherein any number of said modules between 2 and the total number of said plurality are selectively connected electrically in parallel by said master controller to satisfy said demanded load, wherein said master controller is programmed with an algorithm for determining how many of said modules are to be connected together at any given time in order to meet said demanded load, wherein one factor in said algorithm includes a load switching point LSP factor, said load switching point LSP being a percentage of said total power output TP, wherein said percentage is less than 100% of said total power output TP.

2. A fuel cell system in accordance with claim 1 wherein said number of connected modules are varied by said master controller in response to variation in said demanded load.

3. A fuel cell system in accordance with claim 1 wherein at least one of said modules includes at least one solid oxide fuel cell element.

4. A fuel cell system in accordance with claim 1 wherein modules of said plurality not connected in parallel with others of said plurality of modules are in a standby mode.

5. A fuel cell system in accordance with claim 1 wherein said master controller has capability to:
   a) turn on and turn off each of said modules;
   b) enable and disable each of said modules with respect to parallel connectivity with others of said modules; and
   c) substitute a non-connected module for a connected module.

6. A fuel cell system in accordance with claim 1 wherein said master controller has capability to:
   a) monitor the accumulated performance of each of said modules; and
   b) vary the sequence in which said modules are brought into parallel connectivity to balance the progressive deteriorations of said plurality of modules.

7. A fuel cell system in accordance with claim 1 wherein said number of modules to be connected electrically in parallel is selected by said master controller such that each of said modules is operable within a rated power output range of between about 40% and about 80% to satisfy said demanded load.

8. A fuel cell system in accordance with claim 1 wherein said modules are identical and interchangeable.

9. A fuel cell system in accordance with claim 1 wherein factors in said algorithm further include at least one of the system voltage V, the system current C, the total available power of the fuel cell system TP, the load power demand P, and the number of modules N in said plurality.

10. A fuel cell system in accordance with claim 1 wherein said fuel cell modules are physically dispersed from one another.

11. A fuel cell system in accordance with claim 1 wherein said system is an auxiliary power unit.

12. A fuel cell system in accordance with claim 11 wherein said application is a vehicle.

13. A method for controlling a fuel cell system having N independent fuel cell modules variably connectable in parallel and capable of a total power output TP, said system being responsive to a load switching point LSP in a master controller to meet an imposed power requirement P, said load switching point LSP being a percentage of said total power output TP, wherein said percentage is less than 100% of said total power output TP, the method comprising the steps of:
   a) enabling a first module when P is less than LSP times TP divided by N;
   b) enabling a second module in parallel with said first module when P is between one and two times LSP times TP/N;
   c) enabling N-1 modules when P is between 2LSP times TP/N and LSP times (N-1) times TP/N; and
   d) enabling all modules when P is greater than LSP times (N-1) times TP/N.

14. A power generation unit comprising a fuel cell auxiliary power unit system for providing an electric power output in response to an auxiliary electrical load of the unit, wherein said auxiliary power unit system includes
   a plurality of fuel cell modules, each including a local module controllers, wherein said plurality of fuel cell modules are variably connectable in parallel and capable of a total power output TP, and
   a master controller in communication with said plurality of local module controllers,
   wherein any number of said modules between 2 and the total number of said plurality are selectively connected electrically in parallel by said master controller to satisfy said demanded load, wherein said master controller is programmed with an algorithm for determining how many of said modules are to be connected together at any given time in order to meet said demanded load, wherein one factor in said algorithm includes a load switching point LSP factor, said load switching point LSP being a percentage of said total power output TP, wherein said percentage is less than 100% of said total power output TP.

15. A power generation unit in accordance with claim 14 wherein said unit is a vehicle.

16. A vehicle in accordance with claim 14 wherein said fuel cell modules are dispersed at various locations within said vehicle.

17. A method in accordance with claim 13 wherein said load switching point is between about 40% and about 80% of said total power output TP.

18. A method in accordance with claim 13 wherein said load switching point is about 70% of said total power output TP.

* * * * *